(12) United States Patent
Galor

(10) Patent No.: US 9,229,534 B2
(45) Date of Patent: Jan. 5, 2016

(54) ASYMMETRIC MAPPING FOR TACTILE AND NON-TACTILE USER INTERFACES

(71) Applicant: PRIMESENSE LTD., Tel Aviv (IL)

(72) Inventor: Micha Galor, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 262 days.

(21) Appl. No.: 13/778,172

(22) Filed: Feb. 27, 2013

(65) Prior Publication Data

US 2013/0222239 A1    Aug. 29, 2013

Related U.S. Application Data

(60) Provisional application No. 61/603,949, filed on Feb. 28, 2012.

(51) Int. Cl.
  *G06F 3/033* (2013.01)
  *G06F 3/01* (2006.01)
  *G06F 3/0481* (2013.01)

(52) U.S. Cl.
  CPC .............. *G06F 3/017* (2013.01); *G06F 3/0481* (2013.01)

(58) Field of Classification Search
  CPC .......... G06F 3/01; G06F 3/017; G06F 3/0481
  See application file for complete search history.

(56) References Cited

U.S. PATENT DOCUMENTS

| | | |
|---|---|---|
| 4,550,250 A | 10/1985 | Mueller et al. |
| 4,789,921 A | 12/1988 | Aho |
| 4,988,981 A | 1/1991 | Zimmerman et al. |
| 5,264,836 A | 11/1993 | Rubin |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |
| 5,870,196 A | 2/1999 | Lulli et al. |
| 5,917,937 A | 6/1999 | Szeliski et al. |
| 5,973,700 A | 10/1999 | Taylor et al. |

(Continued)

FOREIGN PATENT DOCUMENTS

| | | |
|---|---|---|
| WO | 99/35633 A1 | 7/1999 |
| WO | 03/071410 A2 | 8/2003 |

(Continued)

OTHER PUBLICATIONS

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

(Continued)

*Primary Examiner* — Joe H Cheng

(74) *Attorney, Agent, or Firm* — D. Kligler I.P Services Ltd

(57) ABSTRACT

A method, including receiving, by a computer, a sequence of signals indicating a motion of a hand of a user within a predefined area, and segmenting the area into multiple regions. Responsively to the signals, a region is identified in which the hand is located, and a mapping ration is assigned to the motion of the hand based on a direction of the motion and the region in which the hand is located. Using the assigned mapping ratio, a cursor on a display is presented responsively to the indicated motion of the hand.

19 Claims, 8 Drawing Sheets

(56) References Cited

U.S. PATENT DOCUMENTS

| | | |
|---|---|---|
| 6,002,808 A | 12/1999 | Freeman |
| 6,005,548 A | 12/1999 | Latypov et al. |
| 6,064,387 A | 5/2000 | Canaday et al. |
| 6,072,494 A | 6/2000 | Nguyen |
| 6,084,979 A | 7/2000 | Kanade et al. |
| 6,111,580 A | 8/2000 | Kazama et al. |
| 6,191,773 B1 | 2/2001 | Maruno et al. |
| 6,215,890 B1 | 4/2001 | Matsuo et al. |
| 6,229,541 B1 | 5/2001 | Kamen et al. |
| 6,243,054 B1 | 6/2001 | DeLuca |
| 6,252,988 B1 | 6/2001 | Ho |
| 6,256,033 B1 | 7/2001 | Nguyen |
| 6,262,740 B1 | 7/2001 | Lauer et al. |
| 6,345,111 B1 | 2/2002 | Yamaguchi et al. |
| 6,345,893 B2 | 2/2002 | Fateh et al. |
| 6,452,584 B1 | 9/2002 | Walker et al. |
| 6,456,262 B1 | 9/2002 | Bell |
| 6,507,353 B1 | 1/2003 | Huard et al. |
| 6,512,838 B1 | 1/2003 | Rafii et al. |
| 6,519,363 B1 | 2/2003 | Su et al. |
| 6,559,813 B1 | 5/2003 | DeLuca et al. |
| 6,681,031 B2 | 1/2004 | Cohen et al. |
| 6,686,921 B1 | 2/2004 | Rushmeier |
| 6,690,370 B2 | 2/2004 | Ellenby et al. |
| 6,741,251 B2 | 5/2004 | Malzbender |
| 6,791,540 B1 | 9/2004 | Baumberg |
| 6,803,928 B2 | 10/2004 | Bimber et al. |
| 6,853,935 B2 | 2/2005 | Satoh et al. |
| 6,857,746 B2 | 2/2005 | Dyner |
| 6,951,515 B2 | 10/2005 | Ohshima et al. |
| 6,977,654 B2 | 12/2005 | Malik et al. |
| 7,003,134 B1 | 2/2006 | Covell et al. |
| 7,013,046 B2 | 3/2006 | Kawamura et al. |
| 7,023,436 B2 | 4/2006 | Segawa et al. |
| 7,042,440 B2 | 5/2006 | Pryor et al. |
| 7,042,442 B1 | 5/2006 | Kanevsky et al. |
| 7,151,530 B2 | 12/2006 | Roeber et al. |
| 7,170,492 B2 | 1/2007 | Bell |
| 7,215,815 B2 | 5/2007 | Honda |
| 7,227,526 B2 | 6/2007 | Hildreth et al. |
| 7,257,237 B1 | 8/2007 | Luck et al. |
| 7,259,747 B2 | 8/2007 | Bell |
| 7,264,554 B2 | 9/2007 | Bentley |
| 7,289,227 B2 | 10/2007 | Smetak et al. |
| 7,289,645 B2 | 10/2007 | Yamamoto et al. |
| 7,295,697 B1 | 11/2007 | Satoh |
| 7,301,648 B2 | 11/2007 | Foxlin |
| 7,302,099 B2 | 11/2007 | Zhang et al. |
| 7,333,113 B2 | 2/2008 | Gordon |
| 7,340,077 B2 | 3/2008 | Gokturk |
| 7,340,399 B2 | 3/2008 | Friedrich et al. |
| 7,348,963 B2 | 3/2008 | Bell |
| 7,358,972 B2 | 4/2008 | Gordon et al. |
| 7,370,883 B2 | 5/2008 | Basir et al. |
| 7,427,996 B2 | 9/2008 | Yonezawa et al. |
| 7,428,542 B1 | 9/2008 | Fink et al. |
| 7,474,256 B2 | 1/2009 | Ohta et al. |
| 7,508,377 B2 | 3/2009 | Pihlaja et al. |
| 7,526,120 B2 | 4/2009 | Gokturk et al. |
| 7,536,032 B2 | 5/2009 | Bell |
| 7,573,480 B2 | 8/2009 | Gordon |
| 7,576,727 B2 | 8/2009 | Bell |
| 7,580,572 B2 | 8/2009 | Bang et al. |
| 7,590,941 B2 | 9/2009 | Wee et al. |
| 7,688,998 B2 | 3/2010 | Tuma et al. |
| 7,696,876 B2 | 4/2010 | Dimmer et al. |
| 7,724,250 B2 | 5/2010 | Ishii et al. |
| 7,762,665 B2 | 7/2010 | Vertegaal et al. |
| 7,774,155 B2 | 8/2010 | Sato et al. |
| 7,812,842 B2 | 10/2010 | Gordon |
| 7,821,541 B2 | 10/2010 | Delean |
| 7,834,847 B2 * | 11/2010 | Boillot et al. ............... 345/156 |
| 7,840,031 B2 | 11/2010 | Albertson et al. |
| 7,844,914 B2 | 11/2010 | Andre et al. |
| 7,925,549 B2 | 4/2011 | Looney et al. |
| 7,971,156 B2 | 6/2011 | Albertson et al. |
| 8,018,579 B1 * | 9/2011 | Krah ............................ 356/4.01 |
| 8,150,142 B2 | 4/2012 | Freedman et al. |
| 8,154,781 B2 | 4/2012 | Kroll et al. |
| 8,166,421 B2 | 4/2012 | Magal et al. |
| 8,183,977 B2 | 5/2012 | Matsumoto |
| 8,194,921 B2 | 6/2012 | Kongqiao et al. |
| 8,214,098 B2 | 7/2012 | Murray et al. |
| 8,218,211 B2 | 7/2012 | Kroll et al. |
| 8,249,334 B2 | 8/2012 | Berliner et al. |
| 8,368,647 B2 | 2/2013 | Lin |
| 8,390,821 B2 | 3/2013 | Shpunt et al. |
| 8,400,494 B2 | 3/2013 | Zalevsky et al. |
| 8,405,604 B2 | 3/2013 | Pryor et al. |
| 8,416,276 B2 | 4/2013 | Kroll et al. |
| 8,446,459 B2 | 5/2013 | Fang et al. |
| 8,448,083 B1 | 5/2013 | Migos et al. |
| 8,462,199 B2 | 6/2013 | Givon |
| 8,493,496 B2 | 7/2013 | Freedman et al. |
| 8,514,221 B2 | 8/2013 | King et al. |
| 8,514,251 B2 | 8/2013 | Hildreth et al. |
| 8,625,882 B2 | 1/2014 | Backlund et al. |
| 2002/0057383 A1 | 5/2002 | Iwamura |
| 2002/0071607 A1 | 6/2002 | Kawamura et al. |
| 2002/0158873 A1 | 10/2002 | Williamson |
| 2003/0057972 A1 | 3/2003 | Pfaff et al. |
| 2003/0063775 A1 | 4/2003 | Rafii et al. |
| 2003/0088463 A1 | 5/2003 | Kanevsky et al. |
| 2003/0156756 A1 | 8/2003 | Gokturk et al. |
| 2003/0185444 A1 | 10/2003 | Honda |
| 2003/0227453 A1 | 12/2003 | Beier et al. |
| 2003/0235341 A1 | 12/2003 | Gokturk et al. |
| 2004/0046736 A1 * | 3/2004 | Pryor et al. .................. 345/156 |
| 2004/0046744 A1 | 3/2004 | Rafii et al. |
| 2004/0104935 A1 | 6/2004 | Williamson |
| 2004/0135744 A1 | 7/2004 | Bimber et al. |
| 2004/0155962 A1 | 8/2004 | Marks |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0193413 A1 | 9/2004 | Wilson et al. |
| 2004/0222977 A1 | 11/2004 | Bear et al. |
| 2004/0258314 A1 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0078552 A1 | 4/2007 | Rosenberg |
| 2007/0130547 A1 | 6/2007 | Boillot |
| 2007/0154116 A1 | 7/2007 | Shieh |
| 2007/0230789 A1 | 10/2007 | Chang et al. |
| 2007/0285554 A1 | 12/2007 | Givon |
| 2008/0030460 A1 | 2/2008 | Hildreth et al. |
| 2008/0059915 A1 * | 3/2008 | Boillot .......................... 715/863 |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0236902 A1 | 10/2008 | Imaizumi |
| 2008/0252596 A1 | 10/2008 | Bell et al. |
| 2008/0256494 A1 | 10/2008 | Greenfield |

(56) References Cited

U.S. PATENT DOCUMENTS

| | | |
|---|---|---|
| 2008/0260250 A1 | 10/2008 | Vardi |
| 2008/0281583 A1 | 11/2008 | Slothouber et al. |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0033623 A1* | 2/2009 | Lin .............................. 345/158 |
| 2009/0040215 A1 | 2/2009 | Afzulpurkar et al. |
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0053304 A1* | 3/2010 | Underkoffler et al. .......... 348/42 |
| 2010/0071965 A1 | 3/2010 | Hu et al. |
| 2010/0083189 A1 | 4/2010 | Arlein et al. |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0199231 A1 | 8/2010 | Markovic et al. |
| 2010/0229125 A1 | 9/2010 | Cha |
| 2010/0234094 A1 | 9/2010 | Gagner et al. |
| 2010/0235786 A1 | 9/2010 | Meizels et al. |
| 2010/0295781 A1 | 11/2010 | Alameh et al. |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1 | 4/2011 | Swink et al. |
| 2011/0141053 A1* | 6/2011 | Bulea et al. .................... 345/174 |
| 2011/0144543 A1 | 6/2011 | Tsuzuki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0205186 A1* | 8/2011 | Newton et al. ................ 345/175 |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0038550 A1 | 2/2012 | Lemmey et al. |
| 2012/0078614 A1 | 3/2012 | Galor et al. |
| 2012/0117514 A1 | 5/2012 | Kim et al. |
| 2012/0169583 A1 | 7/2012 | Rippel et al. |
| 2012/0173067 A1 | 7/2012 | Szczerba et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0295661 A1 | 11/2012 | Kim et al. |
| 2012/0313848 A1 | 12/2012 | Galor et al. |
| 2012/0320080 A1 | 12/2012 | Giese et al. |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0127854 A1 | 5/2013 | Shpunt et al. |
| 2013/0155070 A1 | 6/2013 | Luo |
| 2013/0207920 A1 | 8/2013 | McCann et al. |
| 2013/0222239 A1 | 8/2013 | Galor |
| 2013/0263036 A1 | 10/2013 | Berenson et al. |
| 2013/0265222 A1 | 10/2013 | Berenson et al. |
| 2013/0283208 A1 | 10/2013 | Bychkov et al. |
| 2013/0283213 A1 | 10/2013 | Bychkov et al. |
| 2014/0108930 A1 | 4/2014 | Asnis |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007078639 A1 | 7/2007 |
| WO | 2007135376 A2 | 11/2007 |
| WO | 2012107892 A1 | 8/2012 |

OTHER PUBLICATIONS

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

GestureTek Inc., "Gesture Control Solutions for Consumer Devices", Canada, 2009.

Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.

Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.

Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.

Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.

Harville, M., "Stereo Person Tracking with Short and Long Term Plan-View Appearance Models of Shape and Color", Proceedings of the IEEE International Conference on Advanced Video and Signal-Based Surveillance (AVSSS—2005), pp. 522-527, Como, Italy, Sep. 15-16, 2005.

Holte, M., "Fusion of Range and Intensity Information for View Invariant Gesture Recognition", IEEE Conference on Computer

(56) References Cited

OTHER PUBLICATIONS

Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision—Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L. "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
PrimeSense Corporation, "PrimeSensor Reference Design 1.08", USA, year 2010.
International Application PCT/IB2011/053192 Search Report dated Dec. 6, 2011.
U.S. Appl. No. 12/352,622 Official Action dated Sep. 30, 2011.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
U.S. Appl. No. 13/541,786 Office Action dated Feb. 13, 2014.
U.S. Appl. No. 13/584,831 Office Action dated Mar. 20, 2014.
U.S. Appl. No. 13/314,207 Office Action dated Apr. 3, 2014.
U.S. Appl. No. 12/683,452 Office Action dated Jan. 22, 2014.
U.S. Appl. No. 12/314,210 Office Action dated Jan. 10, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/423,322 Office Action dated Apr. 7, 2014.
Hart, D., U.S. Appl. No. 09/616,606 "Method and System for High Resolution , Ultra Fast 3-D Imaging" filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Horn et al., "Toward optimal structured light patterns", Proceedings of International Conference on Recent Advances in 3D Digital Imaging and Modeling, pp. 28-37, Ottawa, Canada, May 1997.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.

(56) References Cited

OTHER PUBLICATIONS

Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
PrimeSense Corporation, "PrimeSensor NITE 1.1", USA, year 2010.
Arm Ltd., "AMBA Specification: AHB", Version 2, pp. 35-92, year 1999.
Commission Regulation (EC) No. 1275/2008, Official Journal of the European Union, Dec. 17, 2008.
PrimeSense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Novero, "Madison video eyewear", year 2012.

International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer-Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Miller, R., "Kinect for XBox 360 Review", Engadget, Nov. 4, 2010.
U.S. Appl. No. 13/161,508 Office Action dated Sep. 9, 2013.
International Application PCT/IB2013/052332 Search Report dated Aug. 26, 2013.
U.S. Appl. No. 13/314,210 Office Action dated Jul. 19, 2013.
U.S. Appl. No. 13/314,207 Office Action dated Aug. 5, 2013.
Sun et al., "SRP Based Natural Interaction Between Real and Virtual Worlds in Augmented Reality", Proceedings of the International Conference on Cyberworlds (CW'08), pp. 117-124, Sep. 22-24, 2008.
Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence: Teleoperators and Virtual Environments, vol. 11, No. 2, pp. 176-188, Apr. 2002.
Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

(56) References Cited

OTHER PUBLICATIONS

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
ZRRO Ltd., "TeleTouch Device", year 2011 (http://www.zrro.com/products.html).
Berliner et al., U.S. Appl. No. 61/732,354, filed Dec. 12, 2012.
Shpunt et al., U.S. Appl. No. 61/764,554, filed Feb. 14, 2013.
U.S. Appl. No. 12/683,452 Office Action dated Nov. 21, 2014.
U.S. Appl. No. 14/055,997 Office Action dated Nov. 21, 2014.
U.S. Appl. No. 13/592,352 Office Action dated Oct. 2, 2014.
Scharstein, D., "Stereo vision for view synthesis", Proceedings of IEEE Conference on Computer Vision and Pattern Recognition, pp. 852-858, year 1996.
Zhu et al., "Generation and Error Characterization of Pararell-Perspective Stereo Mosaics from Real Video", In-Video Registration, Springer, US, chapter 4, pp. 72-105, year 2003.
Chai et al., "Parallel Projections for Stereo Reconstruction", Proceedings of IEEE Conference on Computer Vision and Pattern Recognition, vol. 2, pp. 493-500, year 2000.
Evers et al., "Image-based rendering of complex scenes from multi-camera rig", IEEE Proceedings on Vision, Image and Signal Processing, vol. 152, No. 4, pp. 470-480, Aug. 5, 2005.
Evers et al,. "Image-based Interactive rendering with view dependent geometry", Computer Graphics Forum, (Eurographics '03), vol. 22, No. 3, pp. 573-582, year 2003.
Kauff et al., "Depth map creation and image-based rendering for advanced 3DTV Services Providing Interoperability and Scalability", Signal Processing: Image Communication, vol. 22, No. 2, pp. 217-234, year 2007.
U.S. Appl. No. 13/161,508 Office Action dated Dec. 23, 2014.
U.S. Appl. No. 13/592,352 Office Action dated Jan. 29, 2015.

\* cited by examiner

ASYMMETRIC MAPPING FOR TACTILE AND NON-TACTILE USER INTERFACES

CROSS-REFERENCE TO RELATED APPLICATIONS

This application claims the benefit of U.S. Provisional Patent Application No. 61/603,949, filed Feb. 28, 2012, which is incorporated herein by reference.

FIELD OF THE INVENTION

This invention relates generally to user interfaces for computerized systems, and specifically to user interfaces that are configured to interact with tactile and non-tactile input devices.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including receiving, by a computer, a sequence of signals indicating a motion of a hand of a user within a predefined area, segmenting the area into multiple regions, identifying, responsively to the signals, a region in which the hand is located, assigning a mapping ratio to the motion of the hand based on a direction of the motion and the region in which the hand is located, and presenting, using the assigned mapping ratio, a cursor on a display responsively to the indicated motion of the hand.

There is also provided, in accordance with an embodiment of the present invention an apparatus, including a sensing device, and a computer executing a mixed modality user interface, and configured to receive, from the sensing device, a sequence of signals indicating a motion of a hand of a user within a predefined area, to segment the area into multiple regions, to identify, responsively to the signals, a region in which the hand is located, to assign a mapping ratio to the motion of the hand based on a direction of the motion and the region in which the hand is located, and to present, using the assigned mapping ratio, a cursor on a display responsively to the indicated motion of the hand.

There is further provided, in accordance with an embodiment of the present invention a computer software product, including a non-transitory computer-readable medium, in which program instructions are stored, which instructions, when read by a computer, cause the computer to receive a sequence of signals indicating a motion of a hand of a user within a predefined area, to segment the area into multiple regions, to identify responsively to the signals, a region in which the hand is located, to assign a mapping ratio to the motion of the hand based on a direction of the motion and the region in which the hand is located, and to present, using the assigned mapping ratio, a cursor on a display responsively to the indicated motion of the hand.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
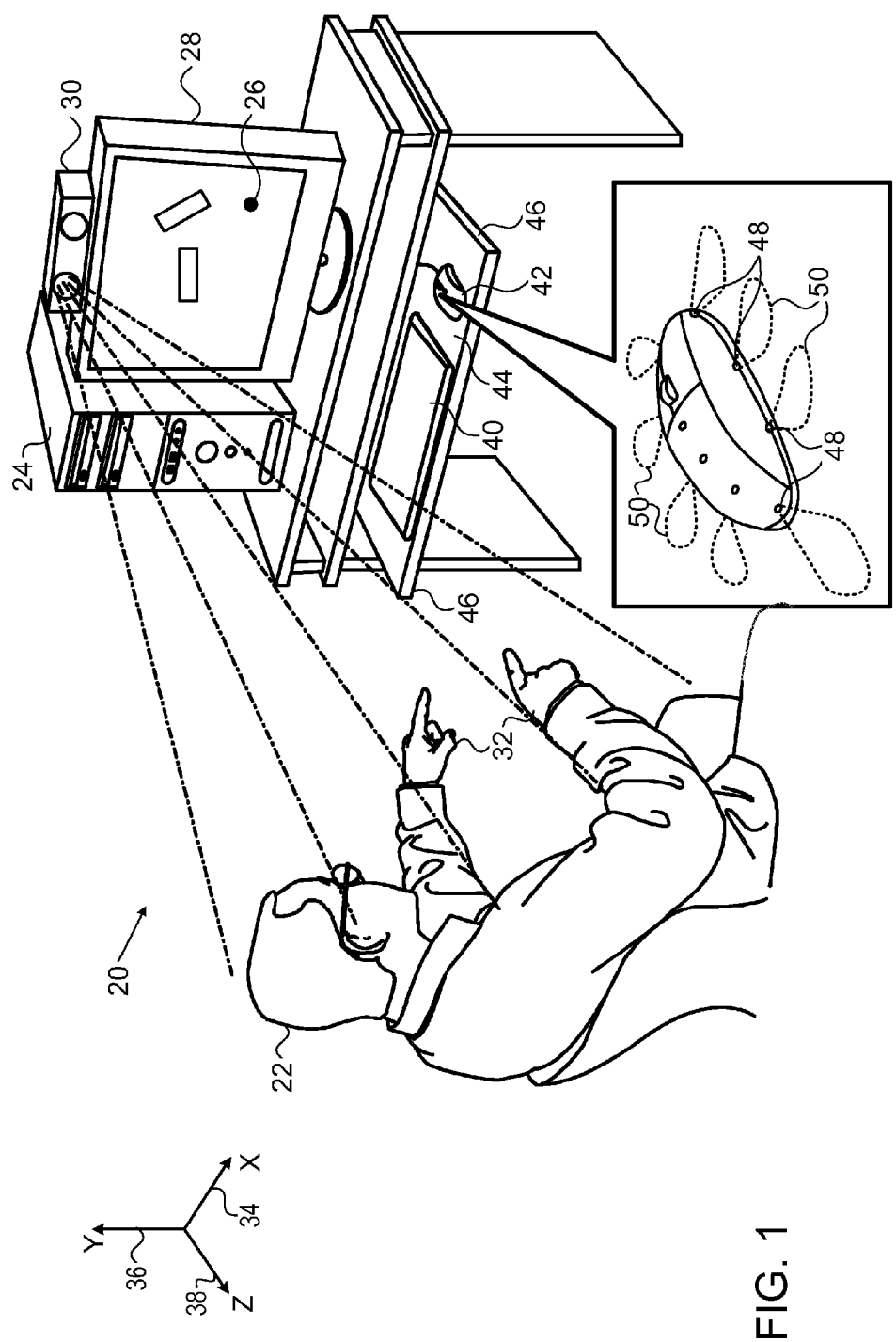
FIG. 1 is a schematic, pictorial illustration of a computer system implementing a mixed modality user interface, in accordance with an embodiment of the present invention.

When interacting with a computer executing a tactile two dimensional (2D) user interface, a user typically manipulates a physical input device such as a mouse positioned on a two-dimensional surface (e.g., a table or a desktop) comprising a horizontal X-axis and a depth Z-axis. Based on the configuration of the 2D surface, the computer system can dynamically map a virtual motion of a cursor presented on the display screen to the physical motion of the mouse.

Alternatively, when interacting with a computer executing a non-tactile three dimensional (3D) user interface, the user may perform gestures in mid-air, and perform the gestures from different positions within a field of view of a 3D sensor coupled to the computer. The gestures may include moving a limb (e.g., a hand) up and down, forward and backward, and side to side, and the computer can dynamically map a virtual motion of a cursor presented on the display screen to the physical motion of the limb.

Embodiments of the present invention provide methods and systems for a computer executing a mixed modality user interface to asymmetrically map input from a user when presenting a cursor on a display. In the embodiments described herein, the mixed modality user interface can be configured to accept signals from both tactile and non-tactile input devices. Examples of tactile input devices include, but are not limited to pointing devices such as keyboards, mice and touchpads. An example of a non-tactile input device comprises a 3D sensor configured to detect a user performing non-tactile 3D gestures.

In some embodiments, the computer receives a sequence of signals indicating a motion of a hand of a user within a predefined area. In the disclosure and in the claims, reference to an area is to be taken as reference to an extent of space, so that an area may be considered as a two-dimensional (2D) region or as a three-dimensional region. The motion of the hand may comprise a motion of the whole hand or any part of the hand, including fingers. The signals may be received from a 3D sensing device configured to generate signals that indicate the motion of the hand, or from a tactile pointing device configured to generate signals that indicate the motion of the hand that is holding or operating the device.

Upon receiving the signals indicating the motion of the hand, the computer can segment the area into multiple regions (either 2D or 3D), identify a region in which the hand is located, and assign, based on a direction of the motion and the region in which the hand is located, a mapping ratio to the motion of the hand. The computer can then present, using the assigned mapping ratio, a cursor on a display responsively to the indicated motion of the hand.

The mapping ratio may comprise a ratio between the user's motion and a corresponding motion of a cursor on a display. For example, if the mapping ratio is 1:1, then for every centimeter the user moves a mouse, the computer responsively moves the cursor one centimeter on a display, and if the mapping ratio is 1:2 then for every centimeter the user moves a mouse, the computer responsively moves the cursor two centimeters on the display.

In some embodiments, the mapping ratio can be inversely related to a difficulty of performing the motion of the hand. For example, as a user moves the hand further from the body, the user may extend joints in her/his elbow and/or shoulder, making the motion more difficult. The computer can compensate for the difficulty by assigning more significance to the motion (i.e., a lower mapping ratio) as the motion becomes more difficult. Likewise, the user returning the hand closer to the body comprises an easier motion, and the computer can assign less significance (i.e., a higher mapping ratio) to the motion as the motion becomes easier.

Therefore, as explained hereinbelow, a mixed modality user interface implementing embodiments of the present invention may define the regions with either symmetric mapping ratios (where any motion within the region is mapped using a single mapping ratio), or asymmetric mapping ratios (where different motions within the region are mapped with different mapping ratios).

System Description

FIG. 1 is a schematic, pictorial illustration of a mixed modality user interface 20 (also referred to herein as user interface 20) for operation by a user 22 of a computer 24, in accordance with an embodiment of the present invention. As explained in detail hereinbelow, user interface 20 is configured to accept input from user 22 in a tactile modality via tactile devices (e.g., a keyboard and/or a mouse) and/or via 3D gestures, in a non-tactile modality, performed by the user. In embodiments described below, computer 24 is configured to process the inputs received from the user in order to control a cursor 26 presented on a display 28.

The non-tactile modality is based on a 3D sensing device 30 coupled to the computer, which captures 3D scene information of a scene that includes the body (or at least a body part, such as one or more of hands 32) of the user. Device 30 or a separate camera/optical sensor (not shown in the figures) may also capture video images of the scene. The information captured by device 30 is processed by computer 24, which drives display 28 accordingly.

Computer 24, executing mixed modality user interface 20, processes data generated by device 30 in order to reconstruct a 3D map of user 22. The term "3D map" refers to a set of 3D coordinates measured, by way of example, with reference to a generally horizontal X-axis 34 in space, a generally vertical Y-axis 36 in space and a depth Z-axis 38 in space, based on device 30. The 3D coordinates represent the surface of a given object, in this case the user's body. In one embodiment, device 30 projects a pattern of spots onto the object and captures an image of the projected pattern. Computer 24 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

The tactile modality of user interface 20 processes input from tactile input devices such as a keyboard 40 and a mouse 42. As explained in detail hereinbelow, computer 24 may be configured to process signals generated by device 30 in order to determine a position of mouse 42 on a two dimensional area such as a desktop 44. While the example shown in FIG. 1 shows computer 24 configured to determine a position of mouse 42 on desktop 44 by processing images received from 3D sensing device 30, in an alternative configuration, the computer may be configured to determine the position of the mouse on the desktop by processing images received from a two dimensional optical sensor (not shown).

Additionally, computer 24 may be configured to process signals generated by device 30 in order to determine a position of mouse 42 relative to relative to physical obstacles (e.g., keyboard 40) and edges 46 of the desktop. In the embodiments described herein, the edges and physical obstacles such as the keyboard may collectively be referred to as impediments.

In some embodiments, mouse 42 may comprise one or more sensing devices 48 (e.g., optical or ultrasonic sensors) positioned on the sides and/or the top of the mouse, and computer 24 can be configured to process signals from sensing devices 48 in order to determine a position of the mouse relative to the physical obstacles and the edges. In the configuration shown in FIG. 1, each sensing device 48 comprises an optical sensor having a field of view 50.

Computer 24 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 24 is shown in FIG. 1, by way of example, as a separate unit from sensing device 30, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 30 may likewise be integrated into the computer or other computerized apparatus that is to be controlled by the sensor output.

Asymmetric 2D Mapping for a Tactile User Interface

Figure 2:
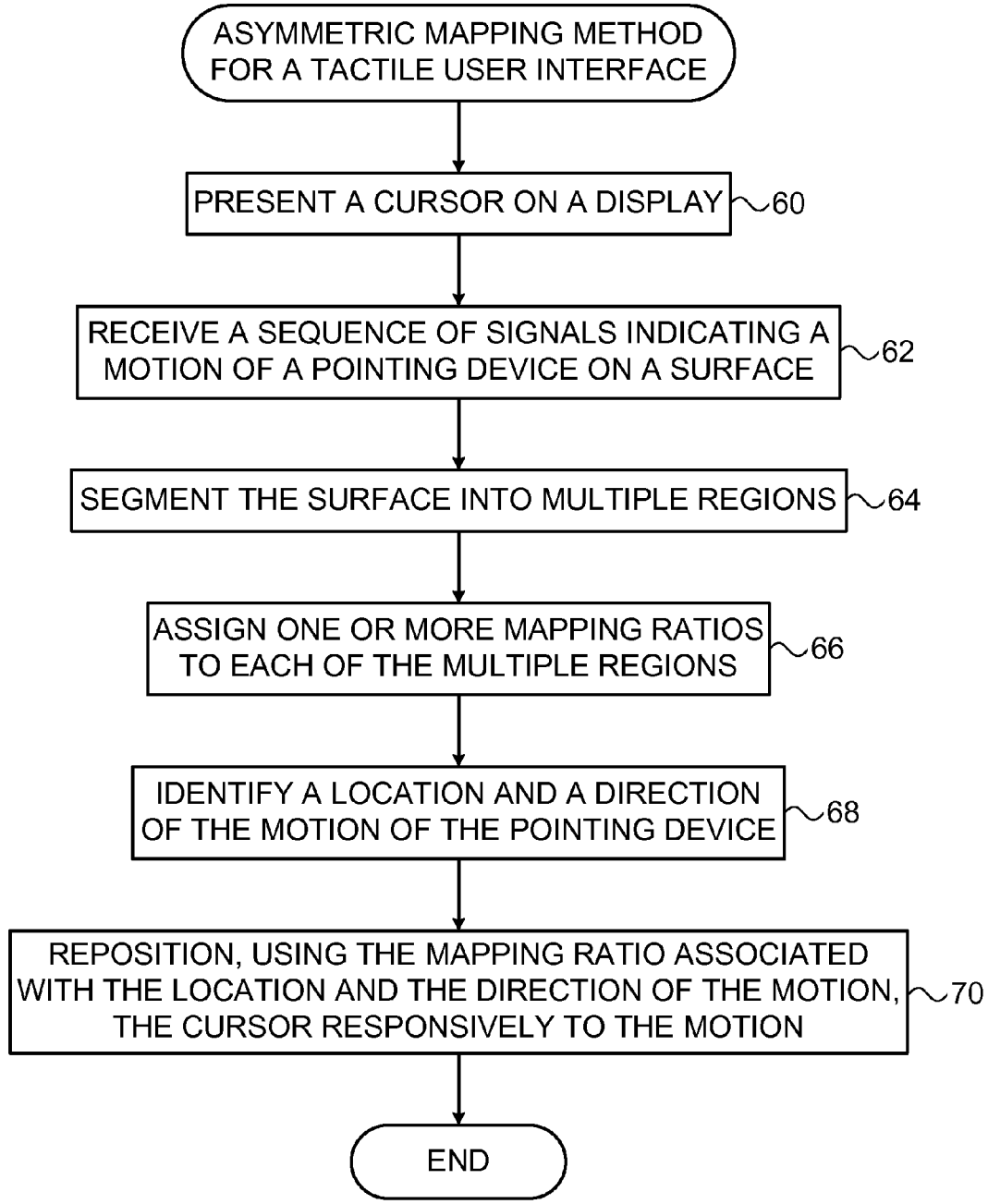
FIG. 2 is a flow diagram that schematically illustrates a method of asymmetric mapping for a tactile pointing device coupled to the computer system, in accordance with an embodiment of the present invention
Figure 3:
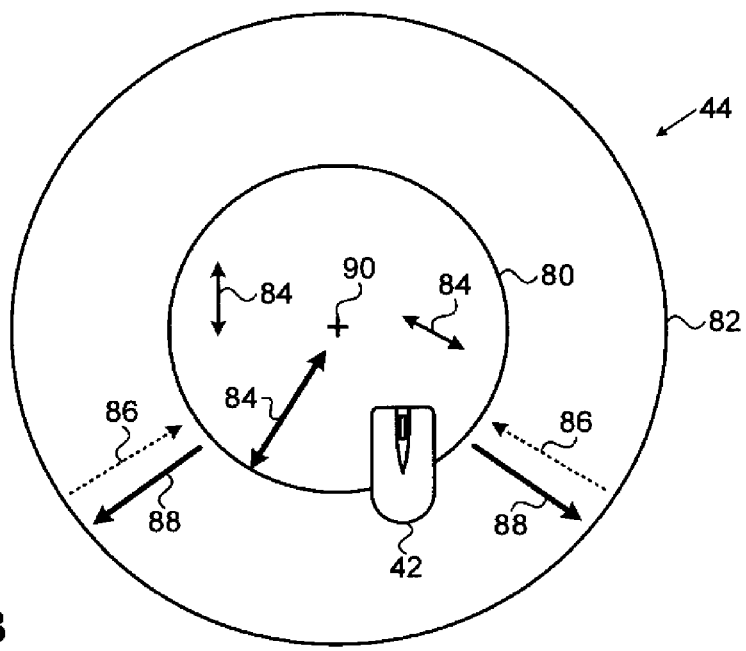
FIG. 3 is a first schematic top view of a two dimensional (2D) surface comprising an inner 2D region and an outer 2D region, in accordance with an embodiment of the present invention.

FIG. 2 is a flow diagram that schematically illustrates a method of asymmetrically mapping a physical motion of mouse 42 to a corresponding motion of cursor 26 on display 28, and FIG. 3 is a first schematic top view desktop 44 comprising an inner 2D region 80 within an outer 2D region 82, in accordance with an embodiment of the present invention. In the embodiments described herein, inner 2D region 80 may also be referred to as inner region 80 and outer 2D region 82 may also be referred to as outer region 82.

In a presentation step 60, computer 24 presents cursor 26 at a first position on display 28, and in a receive step 62, the computer receives a sequence of signals indicating a motion of mouse 42 on desktop 44. In some embodiments, mouse 42 may comprise an optical mouse or a laser mouse, and the sequence of signals may be generated by an optical sensor (not shown) positioned on the bottom of the mouse in response to hand 32 manipulating the mouse. In alternative embodiments, the signal may be generated by sensing devices 48 mounted on sides of the mouse, as shown in FIG. 1.

In additional embodiments, sensing device 30 may generate a sequence of 3D maps that indicate positions of mouse 42 on desktop 44. While the embodiments disclosed herein describe 3D sensing device 30 capturing 3D depth maps indicating the motion of mouse 42 on desktop 44, other optical sensors configured to capture two dimensional images indicating the motion of the mouse are considered to be within the spirit and scope of the present invention.

In a segmentation step 64, computer 24 segments desktop 44 into multiple regions. In the example shown in FIG. 3, computer 24 segments desktop 44 into inner region 80 that is surrounded by outer region 82. In an assign step 66, computer 24 assigns one or more mapping ratios to each of the regions, and in an identification step 68, the computer identifies a location and a direction of the motion of mouse 42. As described hereinbelow, computer 24 can assign the one or more mapping ratios for each of the multiple regions based on the direction of the motion of the mouse. Finally, in a repositioning step 70, computer 24 uses the mapping ratio associated with the location (i.e., region) and the direction of the motion of mouse 42 to responsively reposition cursor 26 on display 28.

For example, if the received sequence of signals indicates that either the user is moving the mouse in any direction within inner 2D region 80 (as indicated by arrows 84), or that the user is moving the mouse within outer 2D region 82 and toward the inner 2D region (as indicated by arrows 86) then computer 24 can assign uses a first mapping ratio when positioning cursor 26 on display 28. However, if the received sequence of 3D maps indicates that the user is moving the mouse within outer 2D region 82 and away from inner 2D region 80 (as indicated by arrows 88), then the computer uses a second mapping ratio when positioning cursor 26 on display 28. In some embodiments, if the user moves the mouse in non-radial directions within outer region 82 (i.e., not away or toward the inner 2D region), computer 24 can symmetrically map the mouse motion using an additional mapping ratio.

As user 22 moves mouse 42 within outer 2D region 82 and away from inner 2D region 80, the motion typically becomes more difficult as the user extends joints in her/his elbow and/or shoulder. Computer 24 can compensate for the difficulty by assigning more significance to the motion as the motion becomes more difficult. For example, computer 24 can set the first mapping ratio to 1:1 and the second mapping ratio to 1:2. In other words, if user 22 moves mouse 42 one centimeter while performing an "easy" motion (i.e., a motion indicated by arrows 84 and 86), then computer 24 can reposition cursor 26 one centimeter in response to the mouse movement. However, if user 22 moves mouse 42 one centimeter while performing a "difficult" motion (i.e., a motion indicated by arrows 88), then computer 24 can reposition cursor 26 two centimeters in response to the mouse movement.

In operation, upon detecting that the user is moving the mouse toward an impediment (e.g., an edge of the 2D surface or an obstacle such as a keyboard), computer 24 can utilize the second mapping ratio to increase the "speed" of cursor 26 on display. By speeding up cursor 26, computer 24 "encourages" user 22 to slow down the physical motion of mouse 42 so that the mouse does not reach the impediment.

While the configuration shown in FIG. 3 shows inner 2D region 80 and outer 2D region 82 comprising concentric circles around a center 90, other shapes of the inner and outer 2D regions are considered to be within the spirit and scope of the present invention. Additionally or alternatively, while the configuration described herein comprises a single outer 2D region 82 surrounding inner 2D region 80, in alternative embodiments, computer 24 may define multiple outer 2D regions surrounding the inner 2D region, with each of the outer 2D regions having an associated mapping ratio.

In further embodiments, computer 24 may define the mapping ratio in outer 2D region 82 as a function, typically a relatively smoothly graded function, of the distance from inner center 90. Alternatively, computer 24 may implement a continuous model, where the mapping ratio in proximity to center 90 is symmetric, and the mapping ratio gradually becomes more asymmetric with any radial motion outward from the center.

Figure 4:
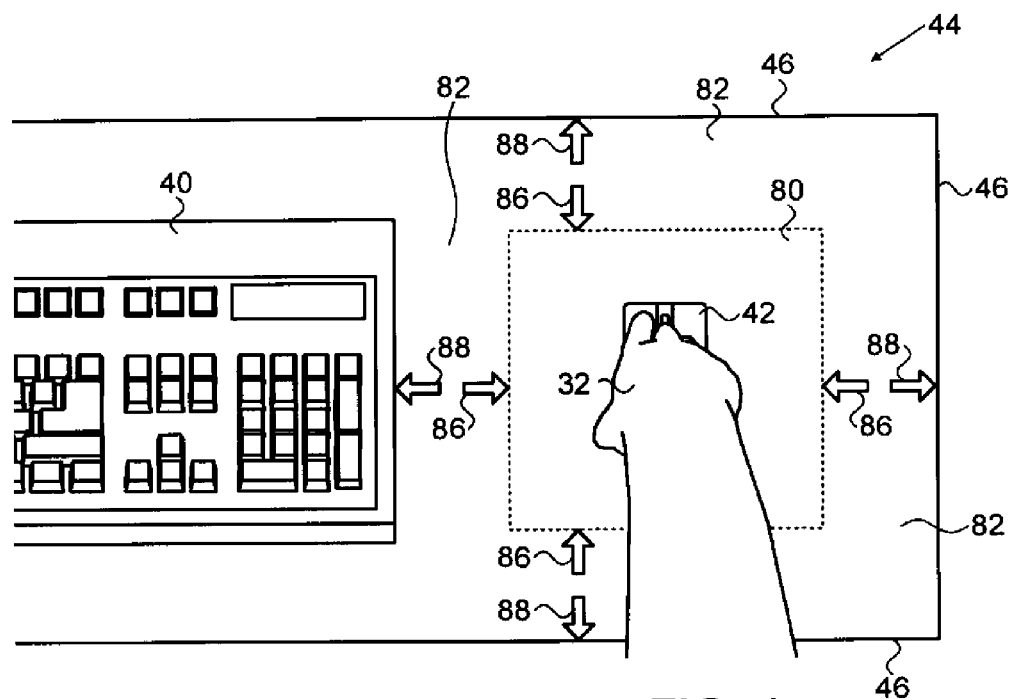
FIG. 4 is a second schematic top view of the 2D surface comprising the inner and the outer 2D regions, in accordance with an embodiment of the present invention.

FIG. 4 is a schematic top view of a second embodiment of inner 2D region 80 and outer 2D region 82 on desktop 44, in accordance with an embodiment of the present invention. In the configuration shown in FIG. 4, computer 24 receives, in step 62, a sequence of signals indicating positions of keyboard 40 (or any other obstacle such as a coffee cup), edges 46, and mouse 42.

As user 22 moves mouse 42 toward edges 46 and obstacles such as keyboard 40, the user typically slows down the speed of the mouse movement in order to avoid the mouse touching the keyboard or moving the mouse off desktop 44. Therefore, based on the position of edges 46 and obstacles such as keyboard 40, computer 24 can define inner 2D region 80 and outer 2D region 82 based on the received positions of the keyboard and the edges. In the example shown in FIG. 4, the inner 2D region and the outer 2D region may be dynamic, since user 22 may move keyboard 40 and/or place additional obstacles (e.g., a cup) on the desktop.

In embodiments where mouse 42 includes optical sensors 48, computer 24 can process signals from sensing devices 48 to determine if the mouse is positioned within inner 2D region 80 or within outer 2D region 82. If the signals received from sensing devices 48 indicate that the mouse is near keyboard 40 or edges 46, then computer 24 can determined that mouse 42 is within a given section of outer region 82, and the computer can use the second mapping ratio to reposition cursor 26 on display 28 responsively to the mouse movement. However, if the signals received from sensing devices 48 do not indicate that the mouse is near keyboard 40 or edges 46, then computer 24 can determine that the mouse is within inner region 80, and the computer can use the first mapping ratio when repositioning cursor 26 on display 28 responsively to the mouse movement.

Figure 5:
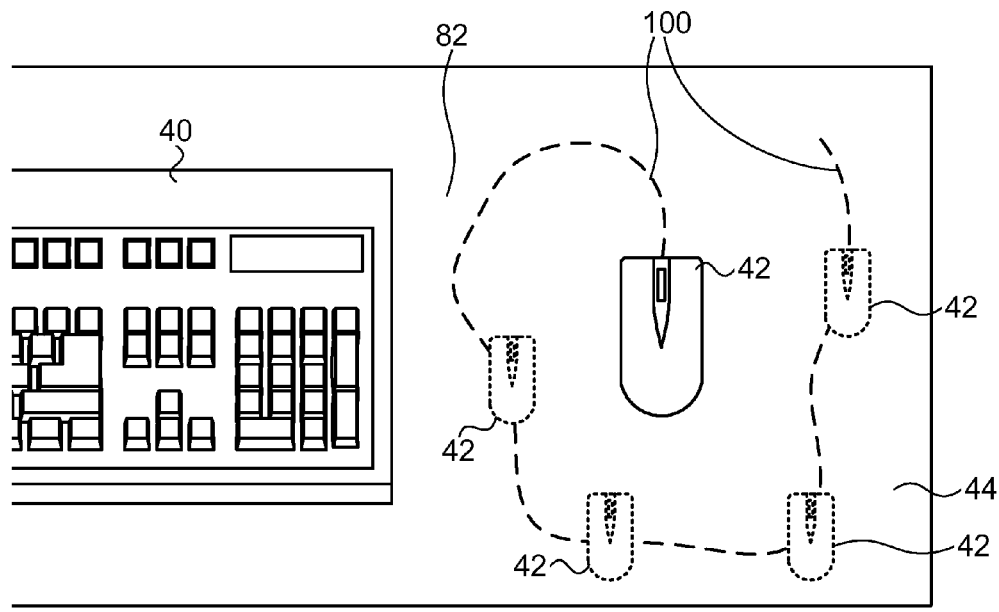
FIG. 5 is a third schematic top view of the 2D surface comprising historical positions of a mouse for use in a statistical model, in accordance with an embodiment of the present invention.

FIG. 5 is a schematic top view of surface 44 comprising historical positions 100 of mouse 42, in accordance with an embodiment of the present invention. In operation, computer 24 captures positions 100 as user 22 moves mouse 42 on surface 44. Computer 24 can capture positions 100 from sensing device 30 or sensing devices 48, as described supra. After collecting positions 100, computer 24 can apply a statistical model that analyzes the positions in order to define inner 2D region 80 and outer 2D region 82.

Figure 6:
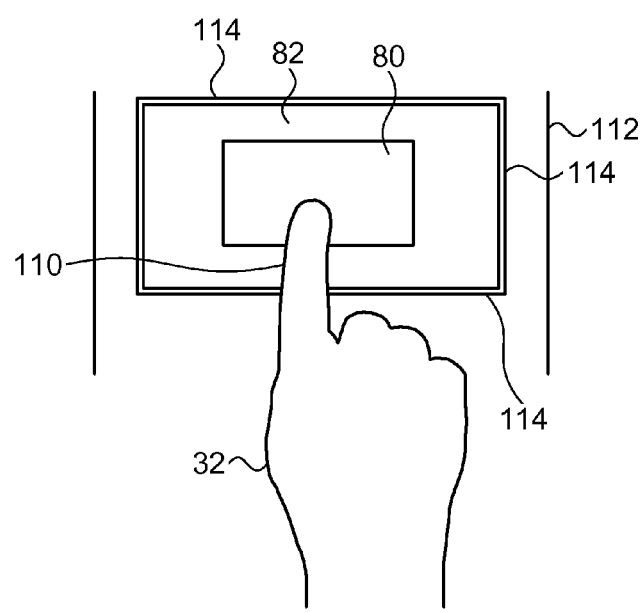
FIG. 6 is a schematic pictorial illustration of a touchpad comprising the inner and the outer 2D regions, in accordance with an embodiment of the present invention.

FIG. 6 is a schematic pictorial illustration of user 22 interacting with mixed modality user interface 20 by moving a finger 110 along a touchpad 112, in accordance with an embodiment of the present invention. In the example shown in FIG. 6, computer 24 can define, based on signals received from tactile sensors (not shown) positioned within the touchpad, inner region 80 and outer region 82 on touchpad 112, so that the computer 26 can position cursor 26 using a smaller mapping ratio (e.g., 1:2) that applies greater significance to the finger movement as finger 110 moves closer to an impediment, e.g., one of touchpad edges 114.

Asymmetric 3D Mapping for a Non-Tactile User Interface

Figure 7:
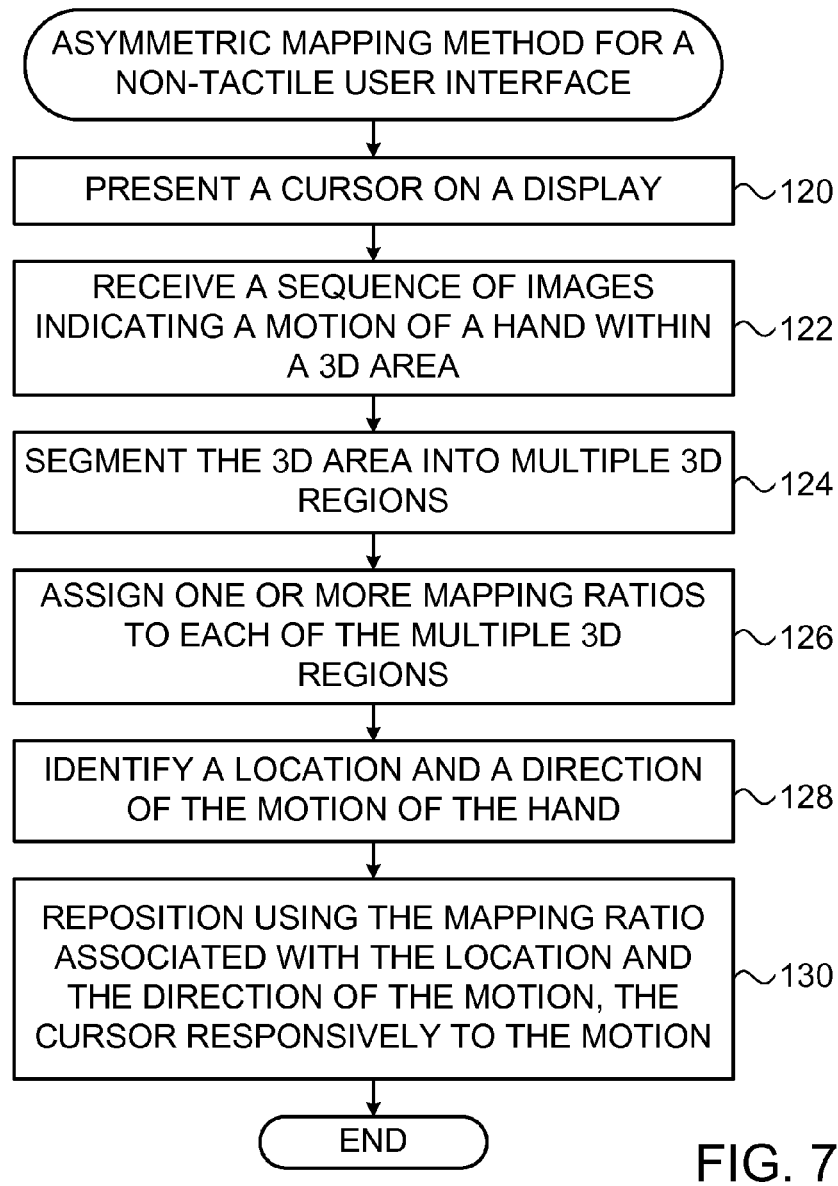
FIG. 7 is a flow diagram that schematically illustrates a method of asymmetric mapping for three dimensional (3D) gestures performed by a user interacting with the mixed modality user interface, in accordance with an embodiment of the present invention.
Figure 8:
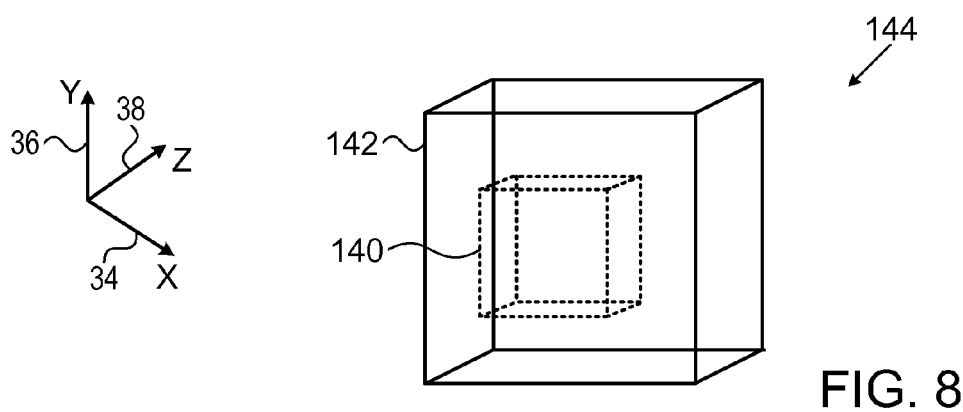
FIG. 8 is a schematic illustration of an inner three dimensional (3D) region, surrounded by an outer 3D region, that are used by the mixed modality user interface when interpreting gestures performed by the user, in accordance with an embodiment of the present invention.

FIG. 7 is a flow diagram that schematically illustrates a method of asymmetrically mapping a 3D gesture performed by hand 32 to a corresponding motion of cursor 26 on display 28, and FIG. 8 is a schematic illustration of a 3D area 144 comprising an inner 3D region 140 within an outer 3D region 142, in accordance with an embodiment of the present invention. In the embodiments described herein, user 22 can perform 3D gestures by moving hand within 3D area 144. Additionally, inner 3D region 140 may also be referred to as inner region 140 and outer 3D region 142 may also be referred to as outer region 142.

In a presentation step 120, computer 24 presents cursor 26 at a first position on display 28, and in a receive step 122, the computer receives, from sensing device 30, a sequence of images indicating a motion of hand 32 within area 144 that includes the hand. In a segmentation step 124, computer 24 segments area 144 into multiple regions. In the example shown in FIG. 8, computer 24 segments area 144 into inner 3D region 140 that is surrounded by outer 3D region 142.

In an assign step 126, computer 24 assigns one or more mapping ratios to each of the regions, and in an identification step 128, the computer identifies a location and a direction of the motion of hand 32. As described hereinbelow, each of the multiple regions may have multiple mapping ratios that are selected based on the direction of the motion of hand 32.

Finally, in a repositioning step 130, computer 24 uses the mapping ratio associated with the location (i.e., region) and the direction of the motion of the hand to responsively reposition cursor 26 on display 28. To reposition cursor 26, computer 24 can extract, from the sequence of 3D maps, 3D coordinates indicating a motion of the user's hand in one of the multiple 3D regions, and map a physical position of the hand to a virtual position in a virtual space defined by the computer.

Figure 9:
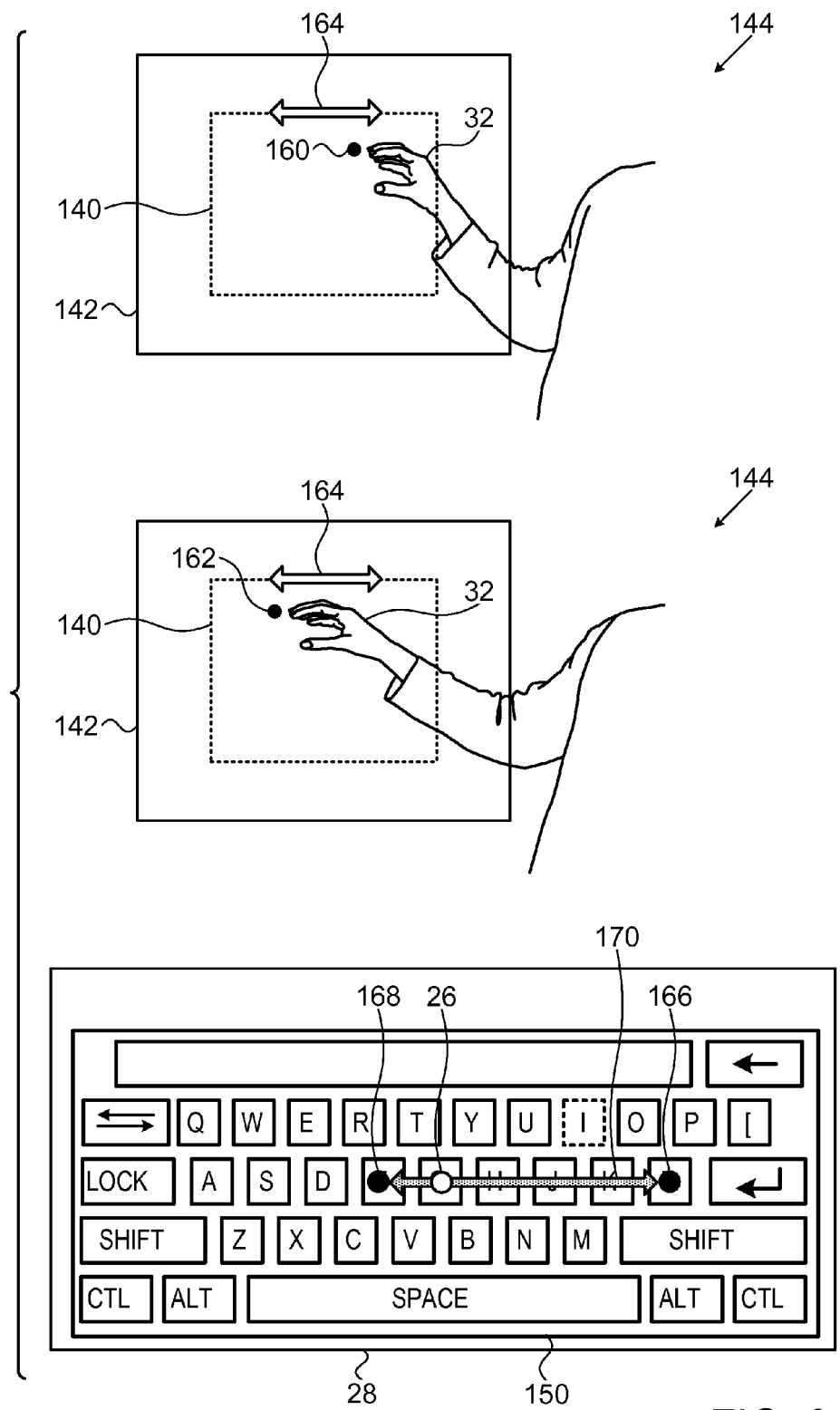
FIG. 9 shows first schematic pictorial illustrations of the user interacting with a virtual keyboard by performing a side-to-side gesture within the inner and the outer 3D regions, in accordance with an embodiment of the current invention.
Figure 10:
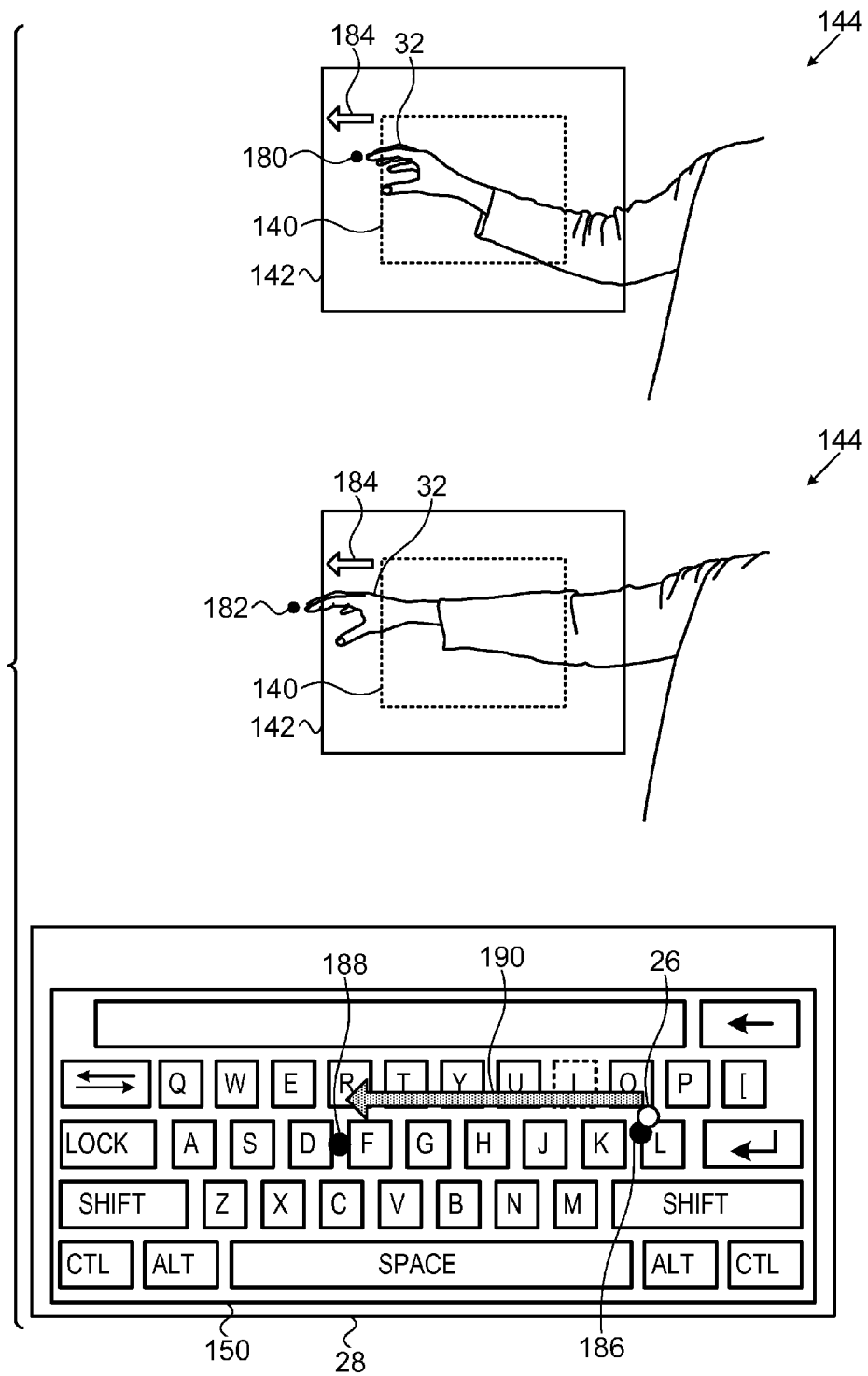
FIG. 10 shows second schematic pictorial illustrations of the user interacting with the virtual keyboard by performing a side-to-side gesture within the inner and the outer 3D regions, in accordance with an embodiment of the current invention.
Figure 11:
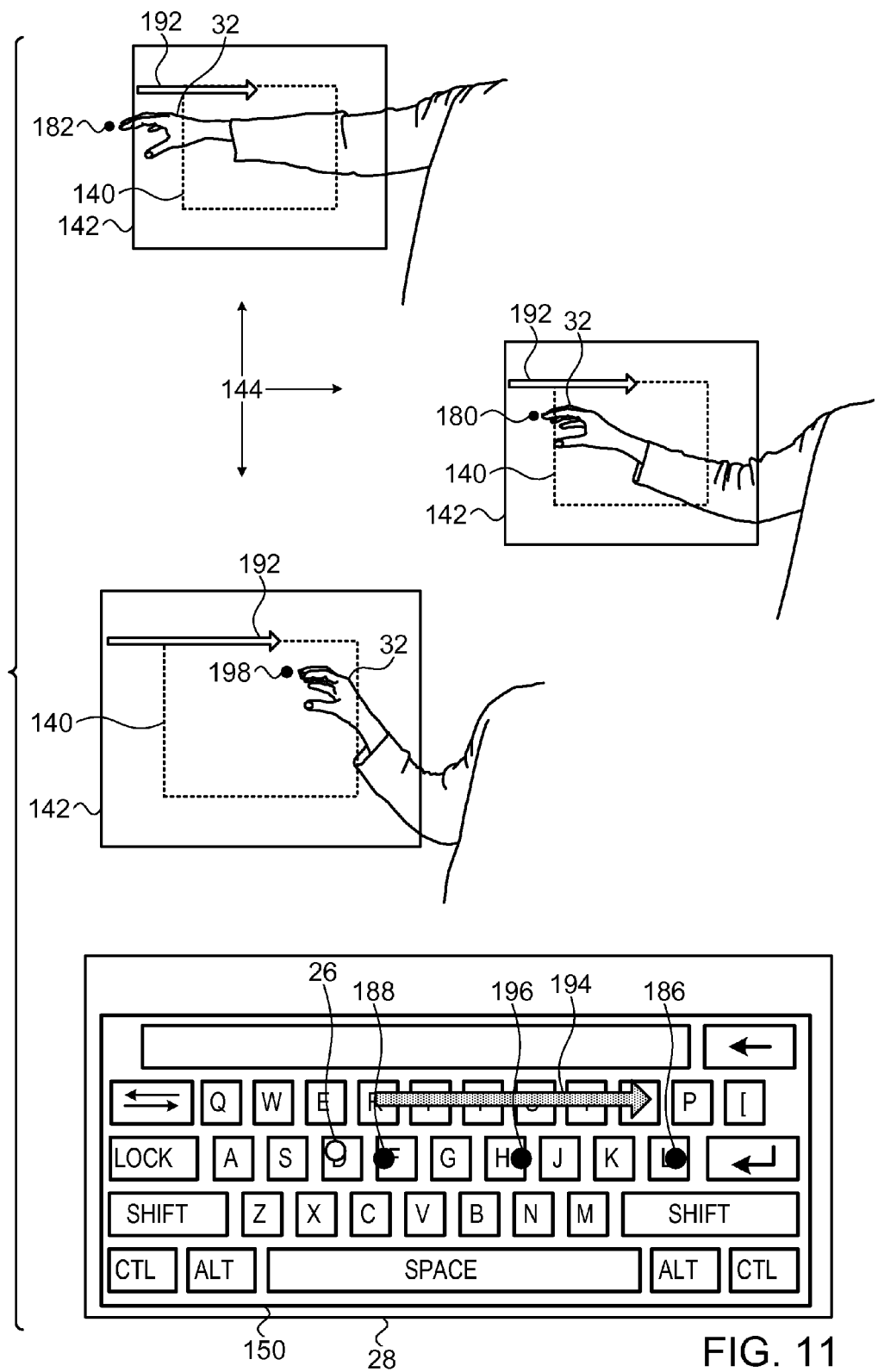
FIG. 11 shows third schematic pictorial illustrations of the user interacting with the virtual keyboard by performing a side-to-side gesture within the inner and the outer 3D regions, in accordance with an embodiment of the current invention.

FIGS. 9, 10 and 11 are schematic pictorial illustrations of user 22 interacting with a virtual keyboard 150 (presented on display 28) by performing, with hand 32, a 3D gesture within inner 3D region 140 and outer 3D region 142, in accordance with an embodiment of the current invention. In the example shown in FIGS. 9-11, user 22 performs side-to-side gestures by moving hand 32 along X-axis 34. As user 22 moves hand 32, computer 24 constructs, using the sequence of images received in step 122, a corresponding sequence of 3D maps indicating a position of the user, including the hand.

In FIG. 9, as user 22 moves hand 32 between a position 160 and a position 162 (as indicated by a double-headed arrow 164), computer 24 identifies that positions 160 and 162 are within inner 3D region 140, and uses a first mapping ratio when repositioning cursor 26 between a position 166 and a position 168 (as indicated by a double-headed arrow 170) in response to the hand movement. For example, if the first ratio is 1:1, then computer 26 moves the cursor one centimeter in response to the received sequence of 3D maps indicating that the user moved the hand one centimeter.

In FIG. 10, as user 22 moves hand 32 from a position 180 to a position 182 (as indicated by a single-headed arrow 184), computer 24 identifies that positions 180 and 182 are within outer 3D region 142, and uses a second mapping ratio when repositioning cursor 26 on display 28. While in outer 3D region 142, it typically becomes more difficult to move the hand away from inner 3D region 140 as the user extends his arm. To compensate for the difficulty of moving hand 32 from position 180 to position 182, computer 24 can assign greater significance to hand motion in the second mapping ratio. For example, the computer can assign 1:1 to the first mapping ratio, and 1:2 to the second mapping ratio.

In other words, computer 24 can assign a mapping ratio that is inversely related to a difficulty of moving the hand in a direction of a motion within a given one of the regions. As described herein, the difficulty may comprise:

- User 22 moving hand 32 so that muscles and tendons in the arm extend.
- User 22 pulling hand 32 back toward the user's body, so that the user's forearm presses against an obstacle such as the user's arm or body.
- While performing a 3D gesture, user 22 moving hand 32 toward an obstacle (described in detail hereinbelow).

Continuing the example described supra (i.e., the first mapping ratio being 1:1), if the second ratio is 1:2, then computer 24 repositions the cursor two centimeters in response to the received sequence of 3D maps indicating that the user moved the hand one centimeter. Therefore as shown in FIG. 10, a relatively small motion of moving hand 32 from position 180 to position 182 results in computer 24 moving cursor 26 a greater distance on display 28, from a position 186 to a position 188, as indicated by a single-headed arrow 190.

In FIG. 11, user 22 moves hand 32 in a motion indicated by a single-headed arrow 192 in order to reposition cursor 26 back to position 186. However, since computer 24 identifies that the motion starts in outer 3D region 142 and moves toward inner 3D region 140, the computer can use the first mapping ratio when positioning cursor 26 on display 28, since the motion is "easy," i.e., has less difficulty than other motions. Therefore, when user 22 moves hand 32 back to position 180, computer 24 moves cursor 26 in a motion indicated by an arrow 194 to a position 196, which is in-between positions 188 and 186.

To move cursor 26 back to position 186, user 22 continues moving hand 32 in the motion indicated by arrow 192 until hand 32 reaches a position 198. Note that when user 22 started moving hand 32 from position 180 in FIG. 10, computer 24 presented cursor 26 at position 186. Due to the asymmetric mapping embodiments described herein, after moving hand to position 182 (i.e., a "difficult" motion), the user needs to move hand greater distance (albeit via an easier motion) to position 198 in order to have computer 24 reposition the cursor back to position 186.

As user 22 performs a gesture by extending hand 32 into outer 3D region 142, the asymmetric mapping embodiments of the present invention help compel user 22 to "drift" hand 32 back to a more comfortable position within inner 3D region 140. In a similar manner, embodiments of the present invention can be used to enable user 22 to keep mouse 42 positioned within inner 2D region 80. Therefore, ongoing interaction with mixed modality user interface 20 typically drives user 22 to "drift" hand 32 back to a more comfortable position, i.e., inner 3D region 140.

As shown in FIG. 10, when user 22 initially positions hand 32 at position 180 (within region 142), computer 24 presents cursor 26 at position 186. However, as shown in FIG. 11, to reposition cursor 26 back to position 186, user 22 moves hand 32 to position 198, which is in the center of region 140. Therefore, computer 24 "preserves space" for motion within region 140, but does not preserve space once user 22 moves hand 32 out to region 142.

Although the configuration shown in FIGS. 8-11 shows inner 3D region 140 comprising concentric cubes, other shapes of the inner and outer regions are considered to be within the spirit and scope of the present invention. Additionally or alternatively, while the configuration described herein comprises a single outer 3D region 142 surrounding inner 3D region 140, in some embodiments, computer 24 may define multiple outer 3D regions surrounding the inner 3D region, with each of the outer 3D regions having an associated mapping ratio. In further embodiments, computer 24 may define the mapping ratio in outer 3D region 142 as a function of the distance from inner 3D region 140.

In additional embodiments, computer 24 may dynamically define the inner and the outer 3D regions as non-uniform regions, depending on obstacles identified in the area (i.e., via the 3D maps captured by sensing device 24) that may restrict movement of the user's hand. Obstacles may include the user's head, the user's body, or any fixed object in the room (e.g., a wall or furniture). Dynamically defining the inner and the outer 3D regions can "encourage" the user to gradually "drift" hand 32 away from the identified objects.

In further embodiments, computer 24 can identify the inner and the outer 3D regions by tracking, over time, the movement of hand 32 (or any other limb of user 22). In other words, based on the tracked (i.e., historical) motion of hand 32, the computer can define the inner and the outer 3D regions. For example, computer 26 can process captured depth maps in order to track positions of hand 32. Tracking hand points is described in further detail in PCT International Publication WO IB2010/051055, which is incorporated herein by reference.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   receiving, by a computer, a sequence of signals indicating a motion of a hand of a user within a predefined area;
   segmenting the area into multiple regions;
   identifying, responsively to the signals, a region in which the hand is located;
   assigning a mapping ratio to the motion of the hand based on a direction of the motion and the region in which the hand is located; and
   presenting, using the assigned mapping ratio, a cursor on a display responsively to the indicated motion of the hand.

2. The method according to claim 1, wherein the signals indicate the hand manipulating a mouse, and wherein the predefined area comprises a two dimensional area including the mouse, and wherein the region comprises a two dimensional region within the two dimensional area.

3. The method according to claim 2, wherein receiving the signals comprises receiving the signals from one or more sensing devices mounted on the mouse, each of the one or more sensing devices selected from a list comprising an optical sensor and an ultrasonic senor.

4. The method according to claim 2, wherein receiving the signals comprises receiving the signals from a sensing device configured to collect images of the area, the sensing device selected from a list comprising a two dimensional optical sensor and a three dimensional optical sensor.

5. The method according to claim 1, wherein the region comprises a two dimensional region within a touchpad, and wherein receiving the signals comprises collecting the signals from tactile sensors positioned within the touchpad.

6. The method according to claim 1, wherein the motion of the hand comprises a three dimensional gesture performed by the hand, and wherein the predefined area comprises a three dimensional area including the hand, and wherein the region comprises a three dimensional region within the three dimensional area.

7. The method according to claim 6, wherein receiving the signals comprises collecting, from a three dimensional sensing device, three dimensional information of the area.

8. The method according to claim 1, wherein the mapping ratio is inversely related to a difficulty of moving the hand in the direction of the motion within the region.

9. The method according to claim 8, wherein the difficulty comprises an impediment positioned in proximity to the hand and in the direction of the motion, the impediment selected from a list comprising an edge of the area and an obstacle positioned within the area.

10. An apparatus, comprising:
a sensing device; and
a computer executing a mixed modality user interface, and configured to receive, from the sensing device, a sequence of signals indicating a motion of a hand of a user within a predefined area, to segment the area into multiple regions, to identify, responsively to the signals, a region in which the hand is located, to assign a mapping ratio to the motion of the hand based on a direction of the motion and the region in which the hand is located, and to present, using the assigned mapping ratio, a cursor on a display responsively to the indicated motion of the hand.

11. The apparatus according to claim 10, and comprising a mouse, and wherein the signals indicate the hand manipulating a mouse, and wherein the predefined area comprises a two dimensional area including the mouse, and wherein the region comprises a two dimensional region within the two dimensional area.

12. The apparatus according to claim 11, and comprising one or more sensing devices mounted on the mouse, and wherein the computer is configured to receive the signals from the one or more sensing devices, each of the one or more sensing devices selected from a list comprising an optical sensor and an ultrasonic senor.

13. The apparatus according to claim 11, and comprising a sensing device configured to collect images of the area, and wherein the computer is configured to receive the signals from the sensing device, the sensing device selected from a list comprising a two dimensional optical sensor and a three dimensional optical sensor.

14. The apparatus according to claim 10, and comprising a touchpad having tactile sensors positioned within the touchpad, wherein the area is comprised in the touchpad, and wherein the region comprises a two dimensional region on the touchpad, and wherein the computer is configured to receive the signals from the tactile sensors.

15. The apparatus according to claim 10, wherein the motion of the hand comprises a three dimensional gesture performed by the hand, and wherein the predefined area comprises a three dimensional area including the hand, and wherein the region comprises a three dimensional region within the three dimensional area.

16. The apparatus according to claim 15, and comprising a three dimensional sensing device configured to collect three dimensional information of the area, and wherein the computer is configured to receive the signals from the three dimensional sensing device.

17. The apparatus according to claim 10, wherein the mapping ratio is inversely related to a difficulty of moving the hand in the direction of the motion within the region.

18. The apparatus according to claim 17, wherein the difficulty comprises an impediment positioned in proximity to the hand and in the direction of the motion, the impediment selected from a list comprising an edge of the area and an obstacle positioned within the area.

19. A computer software product comprising a non-transitory computer-readable medium, in which program instructions are stored, which instructions, when read by a computer, cause the computer to receive a sequence of signals indicating a motion of a hand of a user within a predefined area, to segment the area into multiple regions, to identify responsively to the signals, a region in which the hand is located, to assign a mapping ratio to the motion of the hand based on a direction of the motion and the region in which the hand is located, and to present, using the assigned mapping ratio, a cursor on a display responsively to the indicated motion of the hand.

* * * * *